United States Patent
Jeong

(10) Patent No.: US 10,366,398 B2
(45) Date of Patent: Jul. 30, 2019

(54) METHODS AND SYSTEMS FOR PROVIDING DIGITAL CONTENT BASED ON A SOCIAL RELATIONSHIP

(71) Applicant: LINE Corporation, Shinjuku-ku, Tokyo (JP)

(72) Inventor: Ki Taek Jeong, Seongnam-si (KR)

(73) Assignee: LINE Corporation, Tokyo (JP)

(*) Notice: Subject to any disclaimer, the term of this patent is extended or adjusted under 35 U.S.C. 154(b) by 254 days.

(21) Appl. No.: 15/590,320

(22) Filed: May 9, 2017

(65) Prior Publication Data
US 2017/0345021 A1 Nov. 30, 2017

(30) Foreign Application Priority Data
May 30, 2016 (KR) .................. 10-2016-0066216

(51) Int. Cl.
*H04L 29/08* (2006.01)
*G06Q 30/02* (2012.01)
(Continued)

(52) U.S. Cl.
CPC ........... *G06Q 30/02* (2013.01); *G06F 16/335* (2019.01); *G06F 16/3326* (2019.01);
(Continued)

(58) Field of Classification Search
CPC .... G06Q 30/02; G06Q 50/01; G06F 16/9535; G06F 16/3326; G06F 16/335;
(Continued)

(56) References Cited

U.S. PATENT DOCUMENTS

| 6,463,466 B1* | 10/2002 | Weyer | G06Q 40/04 709/203 |
| 2002/0069218 A1* | 6/2002 | Sull | G06T 3/4092 715/202 |

(Continued)

FOREIGN PATENT DOCUMENTS

| JP | 2006-309589 A | 11/2006 |
| KR | 2003-0006817 A | 1/2003 |

(Continued)

*Primary Examiner* — Philip J Chea
*Assistant Examiner* — Wuji Chen
(74) *Attorney, Agent, or Firm* — Harness, Dickey & Pierce, P.L.C.

(57) ABSTRACT

Provided are methods and systems for providing digital content based on a social relationship. Computer-implemented methods include dividing digital content into a plurality of fragments based on a determined division unit of the digital content, providing direct ownership of a first one of the plurality of fragments to a primary user in response to a request from the user, providing indirect ownership of a second one of the plurality of fragments to the primary user based on at least one secondary user having a social relationship with the primary user and the at least one secondary user having direct ownership of the second one of the plurality of fragments, and providing access to the digital content based on a set of fragments of the plurality of fragments that the primary user has direct ownership or indirect ownership of.

16 Claims, 8 Drawing Sheets

(51) Int. Cl.
  *G06F 16/335*   (2019.01)
  *G06F 16/332*   (2019.01)
  *G06F 16/9535*  (2019.01)
  *G06Q 50/00*    (2012.01)
  *H04L 29/06*    (2006.01)
  *H04W 4/21*     (2018.01)

(52) U.S. Cl.
  CPC ......... *G06F 16/9535* (2019.01); *G06Q 50/01* (2013.01); *H04L 63/102* (2013.01); *H04L 63/104* (2013.01); *H04L 67/306* (2013.01); *H04W 4/21* (2018.02)

(58) Field of Classification Search
  CPC ... H04L 63/102; H04L 67/306; H04L 63/104; H04W 4/21
  See application file for complete search history.

(56) References Cited

U.S. PATENT DOCUMENTS

| | | | | |
|---|---|---|---|---|
| 2002/0156691 | A1* | 10/2002 | Hughes | G06Q 30/02 705/51 |
| 2009/0049118 | A1* | 2/2009 | Stevens | G06F 16/40 709/203 |
| 2011/0093337 | A1* | 4/2011 | Granit | G06Q 30/0251 705/14.53 |
| 2011/0219413 | A1* | 9/2011 | Krikorian | G11B 27/034 725/109 |
| 2012/0096357 | A1* | 4/2012 | Folgner | G11B 27/34 715/726 |
| 2012/0216296 | A1* | 8/2012 | Kidron | G06F 15/167 726/28 |
| 2012/0254356 | A1* | 10/2012 | Kashiwagi | G06Q 30/0201 709/217 |
| 2013/0260893 | A1 | 10/2013 | Shin et al. | |
| 2013/0332543 | A1 | 12/2013 | Shin et al. | |
| 2014/0019540 | A1 | 1/2014 | Shin et al. | |
| 2015/0326629 | A1* | 11/2015 | Conway | H04L 65/403 705/39 |
| 2016/0006944 | A1 | 1/2016 | Voss et al. | |

FOREIGN PATENT DOCUMENTS

| | | |
|---|---|---|
| KR | 10-0827198 B1 | 5/2008 |
| KR | 2014-0003960 A | 1/2014 |
| WO | WO-2015/065001 A1 | 5/2015 |

\* cited by examiner

FIG. 8

| User | A | | | | | | | | | |
|---|---|---|---|---|---|---|---|---|---|---|
| Content | 1 | | | 2 | | | 3 | | | |
| Fragment | 1-a | 1-b | 1-c | 2-a | 2-b | 2-c | 3-a | 3-b | 3-c | |
| Direct owning | ○ | × | × | ○ | × | × | × | × | × | |
| Indirect owning | × | ○ | ○ | ○ | ○ | ○ | ○ | ○ | ○ | |
| Final owning | ○ | ○ | ○ | ○ | ○ | ○ | ○ | ○ | ○ | |
| Content availability | ○ | | | ○ | | | × | | | |

| User | B | | | | | | | | | |
|---|---|---|---|---|---|---|---|---|---|---|
| Content | 1 | | | 2 | | | 3 | | | |
| Fragment | 1-a | 1-b | 1-c | 2-a | 2-b | 2-c | 3-a | 3-b | 3-c | |
| Direct owning | × | ○ | ○ | × | ○ | ○ | × | ○ | × | |
| Indirect owning | ○ | × | × | ○ | × | × | × | × | ○ | |
| Final owning | ○ | ○ | ○ | ○ | ○ | ○ | × | ○ | ○ | |
| Content availability | × | | | ○ | | | × | | | |

| User | C | | | | | | | | | |
|---|---|---|---|---|---|---|---|---|---|---|
| Content | 1 | | | 2 | | | 3 | | | |
| Fragment | 1-a | 1-b | 1-c | 2-a | 2-b | 2-c | 3-a | 3-b | 3-c | |
| Direct owning | × | × | ○ | ○ | ○ | × | ○ | ○ | ○ | |
| Indirect owning | ○ | × | × | ○ | × | × | × | × | × | |
| Final owning | ○ | × | ○ | ○ | ○ | × | ○ | ○ | ○ | |
| Content availability | × | | | × | | | ○ | | | |

METHODS AND SYSTEMS FOR PROVIDING DIGITAL CONTENT BASED ON A SOCIAL RELATIONSHIP

CROSS-REFERENCE TO RELATED APPLICATION(S)

This application claims priority under 35 U.S.C. § 119 to Korean Patent Application No. 10-2016-0066216 filed on May 30, 2016, in the Korean Intellectual Property Office (KIPO), the entire contents of which are incorporated herein by reference.

BACKGROUND

One or more example embodiments relate to a methods and systems for providing digital content.

A rapid increase in the number of users of ultra high speed communication networks has enabled the development of new services and the diversification of services provided through a communication network. A common service using the communication network may be a content providing service that provides digital contents, such as voice, videos, and images, through the communication network.

SUMMARY

Example embodiments provide methods and systems that may divide digital content into a plurality of fragments and may distribute the digital content divided into the plurality of fragments.

Example embodiments also provide methods and systems that enable digital content of a division unit to be shared between users having a social relationship.

According to example embodiments, there is provided computer-implemented methods, including executing on a processor the operation of dividing digital content into a plurality of fragments based on a determined division unit of the digital content. The method also includes executing on a processor the operation of providing direct ownership of a first one of the plurality of fragments to a primary user in response to a request from the user. The method also includes executing on a processor the operation of providing indirect ownership of a second one of the plurality of fragments to the primary user based on at least one secondary user having a social relationship with the primary user and the at least one secondary user having direct ownership of the second one of the plurality of fragments. The method also includes executing on a processor the operation of determining whether the primary user is qualified to access to the digital content based on a set of fragments of the plurality of fragments that the primary user has direct ownership or indirect ownership of. Furthermore, the method also includes executing on a processor the operation of providing access to the digital content that the primary user is qualified to access.

According to example embodiments, there is provided a non-transitory computer-readable medium including computer-readable instructions to cause a computer system to implement a digital content providing method. The computer-readable instructions control the computer system to implement the digital content providing method including dividing digital content into a plurality of fragments based on a determined division unit of the digital content. Implementing the digital content providing method further includes providing direct ownership of a first one of the plurality of fragments to a primary user in response to a request from the primary user. Implementing the digital content providing method further includes providing indirect ownership of a second one of the plurality of fragments to the primary user based on at least one secondary user having a social relationship with the primary user and the at least one secondary user having direct ownership of the second one of the plurality of fragments. Implementing the digital content providing method further includes determining whether the primary user is qualified to access to the digital content based on a set of fragments of the plurality of fragments that the primary user has direct ownership or indirect ownership of. Furthermore, implementing the digital content providing method includes providing access to the digital content that the primary user is qualified to access.

According to example embodiments, there is provided a system, the system including a memory to which at least one program is loaded; and at least one processor. Under control of the program, the at least one processor is configured to perform processes including dividing digital content into a plurality of fragments based on a determined division unit of the digital content. The processes that the processor is configured to perform also include providing direct ownership of a first one of the plurality of fragments to a primary user in response to a request from the primary user. The processes that the processor is configured to perform also include providing indirect ownership of a second one of the plurality of fragments to the primary user based on at least one secondary user having a social relationship with the primary user and the at least one secondary user having direct ownership of the second one of the plurality of fragments. The processes that the processor is configured to perform also include determining whether the primary user is qualified to access to the digital content based on a set of fragments of the plurality of fragments that the primary user has direct ownership or indirect ownership of. Furthermore, the processes that the processor is configured to perform also include providing access to the digital content that the primary user is qualified to access.

According to example embodiments, it is possible to divide digital content into a plurality of fragments and to distribute the digital content divided into the plurality of fragments. Further, users having a social relationship may share digital content of a division unit.

According to example embodiments, it is possible to effectively distribute network resources used for a service by distributing digital content based on a division unit. Through the distribution of the digital content based on the division unit, a user may use the digital content at a reduced price and a seller may improve sales of the digital content.

According to example embodiments, users having a social relationship may share digital content therebetween by dividing the digital content based on a division unit. Since the users may be required to maintain the social relationship in order to share the digital content, it is possible to reduce service terminations by users.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 8 illustrates a data structure including a content fragment list owned by different users according to example embodiments.

Figure 1:
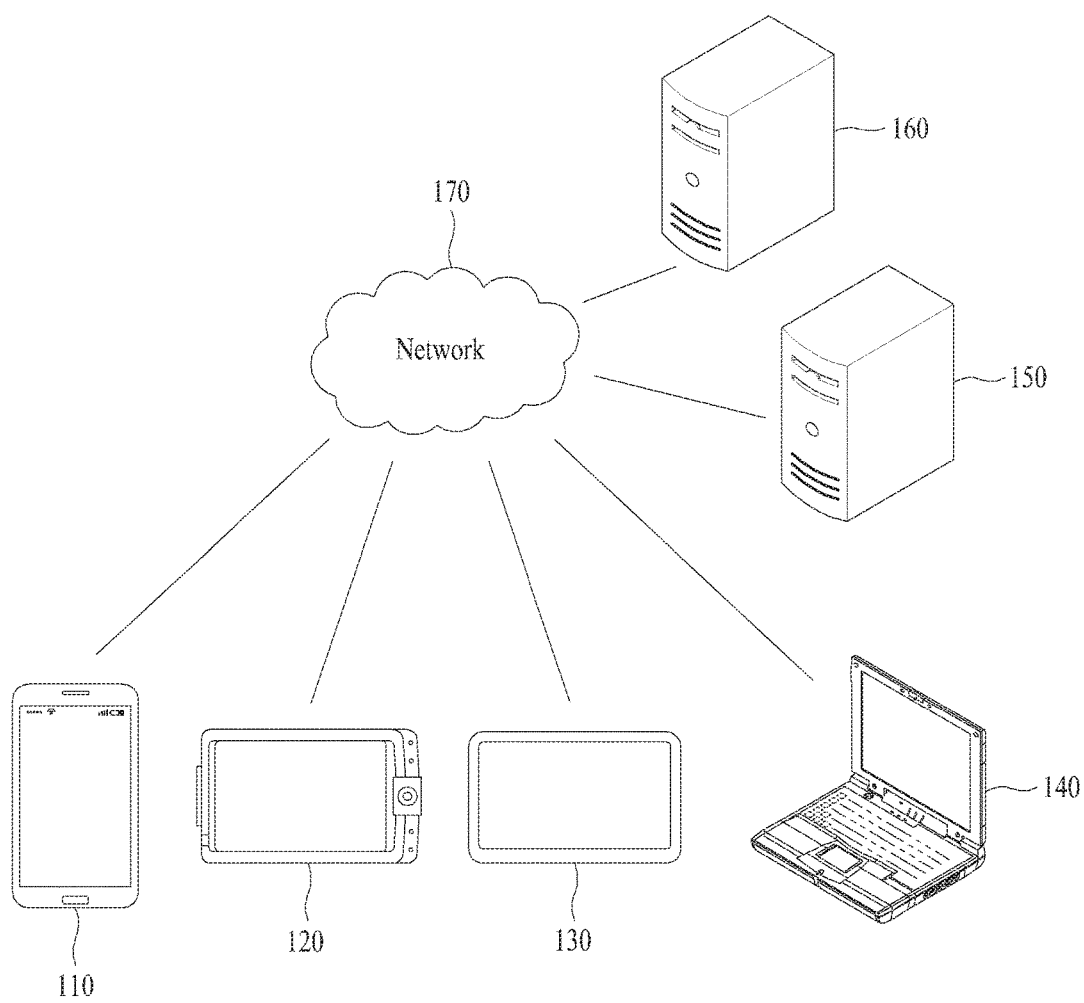
FIG. 1 is a diagram illustrating a network environment according to example embodiments.

It should be noted that these figures are intended to illustrate the general characteristics of methods and/or structure utilized in certain example embodiments and to supplement the written description provided below. These drawings are not, however, to scale and may not precisely reflect the specific structural or performance characteristics of any given example embodiments, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "includes", "including", "included", "include", "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. In example embodiments, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a Systemon-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. In example embodiments, program code may include both machine code produced by a compiler and higher level program code that is executed using an interpreter.

In example embodiments, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In example embodiments, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In example embodiments, software and data may be stored by one or more computer readable recording mediums, including the tangible or non-transitory computer-readable storage media discussed herein.

According to example embodiments, computer processing devices may be described as including various functional units that perform various operations and/or functions to increase the clarity of the description. However, computer processing devices are not intended to be limited to these functional units. For example, in example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing example embodiments described herein.

The computer programs, program code, instructions, or some combination thereof, may also be loaded from a separate computer readable storage medium into the one or more storage devices and/or one or more computer processing devices using a drive mechanism. Such a separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, example embodiments may describe one computer processing device; however, one skilled in the art will appreciate that a hardware device may include multiple processing elements and multiple types of processing elements. In example embodiments, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating a network environment according to example embodiments. Referring to FIG. 1, the network environment includes a plurality of electronic devices 110, 120, 130, and 140, a plurality of servers 150 and 160, and a network 170. FIG. 1 is provides example embodiments only and thus, the number of electronic devices and/or the number of servers are not limited thereto.

Each of the plurality of electronic devices 110, 120, 130, and 140 may be a fixed terminal or a mobile terminal configured as a computer device. In example embodiments, the plurality of electronic devices 110, 120, 130, and 140 may be a smartphone, a mobile phone, a tablet, a wearable device, a computer, a laptop computer, a navigation device, a digital broadcasting terminal, a personal digital assistant (PDA), a portable multimedia player (PMP), and the like. In example embodiments, the electronic device 110 may communicate with other electronic devices 120, 130, and/or 140, and/or the servers 150 and/or 160 over the network 170 in a wired communication manner or in a wireless communication manner.

The communication scheme is not particularly limited and may include communication methods that uses a near field communication between devices as well as communication methods using a communication network such as a mobile communication network, the wired Internet, the wireless Internet, and a broadcasting network, which may be included in the network 170. In example embodiments, the network 170 may include at least one of network topologies that include networks, such as a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these are only example embodiments and example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170.

In example embodiments, the server 160 may provide a file for installing an application to the electronic device 110 connected through the network 170. In this case, the electronic device 110 may install the application using the file provided from the server 160. Also, the electronic device 110 may connect to the server 150 and may receive a service or content provided from the server 150 under control of at least one program, such as a browser or the installed application, and an operating system (OS) included in the electronic device 110. In example embodiments, in response to a service request message transmitted from the electronic device 110 to the server 150 over the network 170 under control of the application, the server 150 may transmit a code corresponding to the service request message to the electronic device 110 and the electronic device 110 may provide content to a user by configuring and displaying a screen corresponding to the code under control of the application. In example embodiments, the server 150 may serve as a service platform that includes a social network service (SNS) and the like, and may provide a corresponding service to a user requesting the service in conjunction with the application installed on the electronic device 110. In example embodiments, the server 150 may set a communication session between the electronic device 110 and the electronic device 120 connected to the server 150. In this case, the electronic devices 110 and 120 may use a service, such as a data transmission, a chat, a voice call, a video call, etc., between the electronic devices 110 and 120 through the communication session. Depending on cases, the server 150 may serve as a digital content distribution platform with an SNS platform. Digital contents may be distributed based on an SNS by constructing the digital content distribution platform on the SNS platform. In response to an SNS user requesting digital content, the server 150 may provide the requested digital content through the application installed on the electronic device 110.

Figure 2:
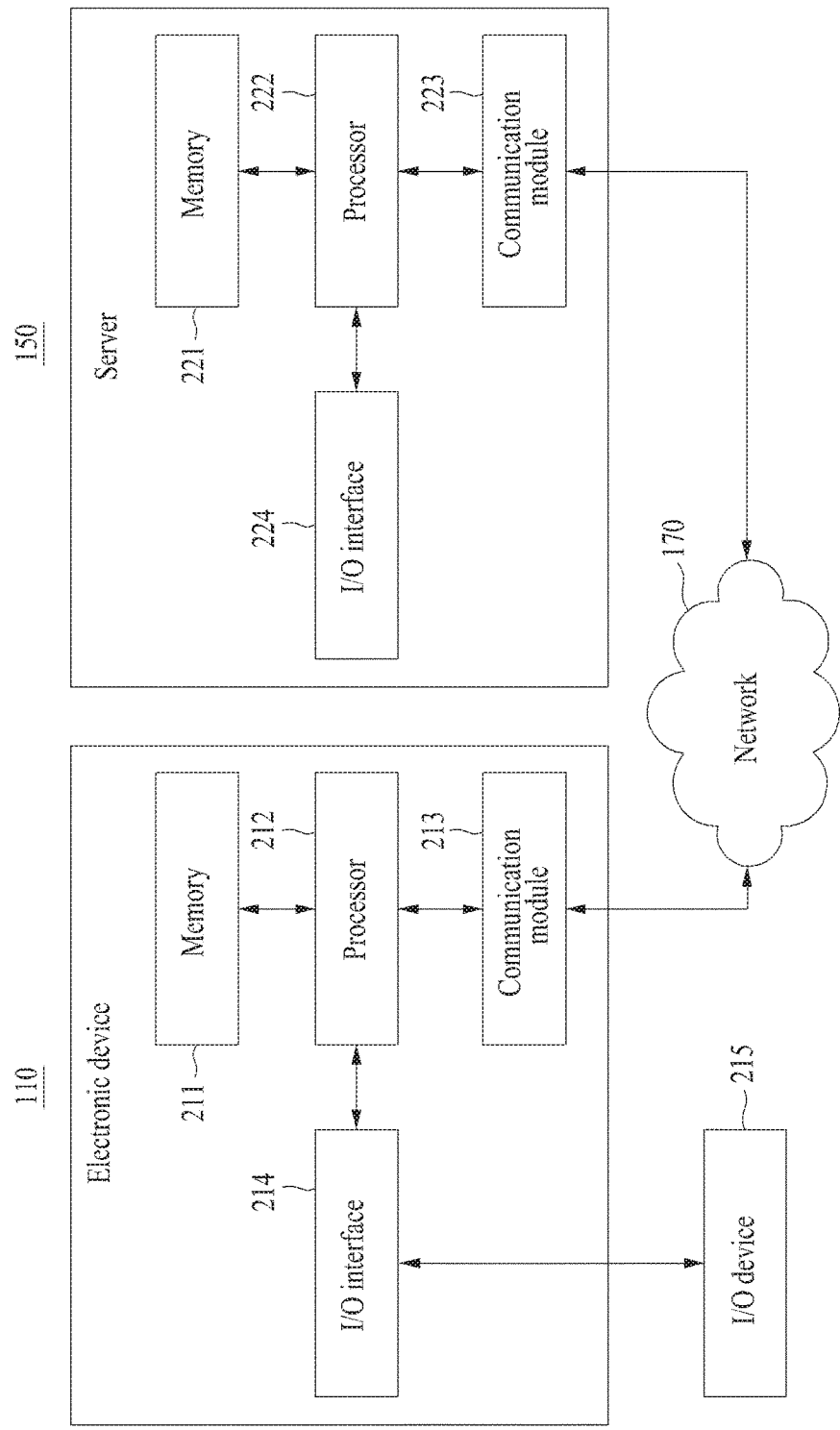
FIG. 2 is a block diagram illustrating a configuration of an electronic device and a server according to example embodiments.

FIG. 2 is a block diagram illustrating a configuration of an electronic device and a server according to example embodiments. FIG. 2 illustrates a configuration of the electronic device 110 representative of a single electronic device and illustrates a configuration of the server 150 representative of a single server. The same or similar constituent elements may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, such as a code for an application for a video call, a browser, etc., installed and executed on the electronic device 110, may be stored in the memory 211, 221. Such software constituent elements may be loaded from another computer-readable storage medium separate from the memory 211, 221 using a drive mechanism. The other computer-readable storage medium may include a floppy drive, a disk, a tape, a DVD/CD-ROM drive, a memory card, etc. According to example embodiments, software constituent elements may be loaded to the memory 211, 221 through the communication module 213, 223, instead of, or in addition to, the computer-readable storage medium. In example embodiments, at least one program may be loaded to the memory 211, 221 based on a program (e.g., the application), installed by files provided over the network 170 from developers or a file distribution system (e.g., the server 160), which provides an installation file of the application.

The processor 212, 222 may be configured to process computer-readable instructions, such as the aforementioned at least one program code, of a computer program by performing basic arithmetic operations, logic operations, and I/O operations. The computer-readable instructions may be provided from the memory 211, 221 and/or the communication module 213, 223 to the processor 212, 222. In example embodiments, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device (e.g., the electronic device 120) or another server (e.g., the server 160). In example embodiments, the processor 212 of the electronic device 110 may transfer a request, such as a request for a video call service, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. In example embodiments, a control signal, an instruction, etc., of the server 150 received through the communication module 213 may be transferred to the processor 212 or the memory 211, and content, a file, etc., may be stored in memory 211 or another storage medium further includable in the electronic device 110.

The I/O interface 214, 224 may be a device used for interface with an I/O device 215. In example embodiments, an input device may include a keyboard, a mouse, etc., and an output device may include a device, such as a display for displaying a communication session of an application. In example embodiments, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to example embodiments, the electronic device 110 and the server 150 may include a greater or lesser number of constituent elements than the number of constituent elements shown in FIG. 2. In example embodiments, the electronic device 110 may include at least a portion of the I/O device 215, or may further include other constituent elements, such as a transceiver, a global positioning system (GPS) module, a camera, a variety of sensors, a database, and the like. In detail, if the electronic device 110 is a smartphone, the electronic device 110 may be configured to further include a variety of constituent elements, such as an accelerometer sensor, a gyro sensor, a camera, various physical buttons, a button using a touch panel, an I/O port, a vibrator for vibration, etc., which are generally included in the smartphone.

Figure 3:
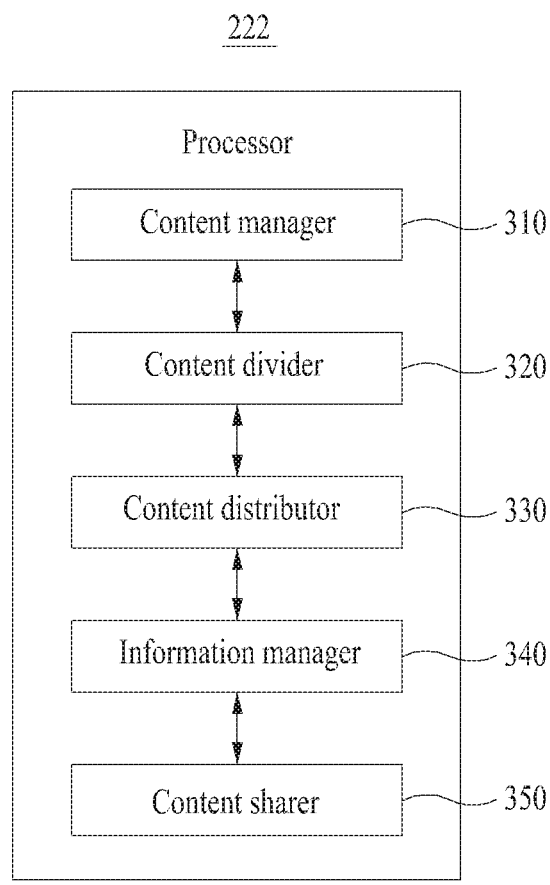
FIG. 3 is a block diagram illustrating constituent elements includable in a processor of a server according to example embodiments.
Figure 4:
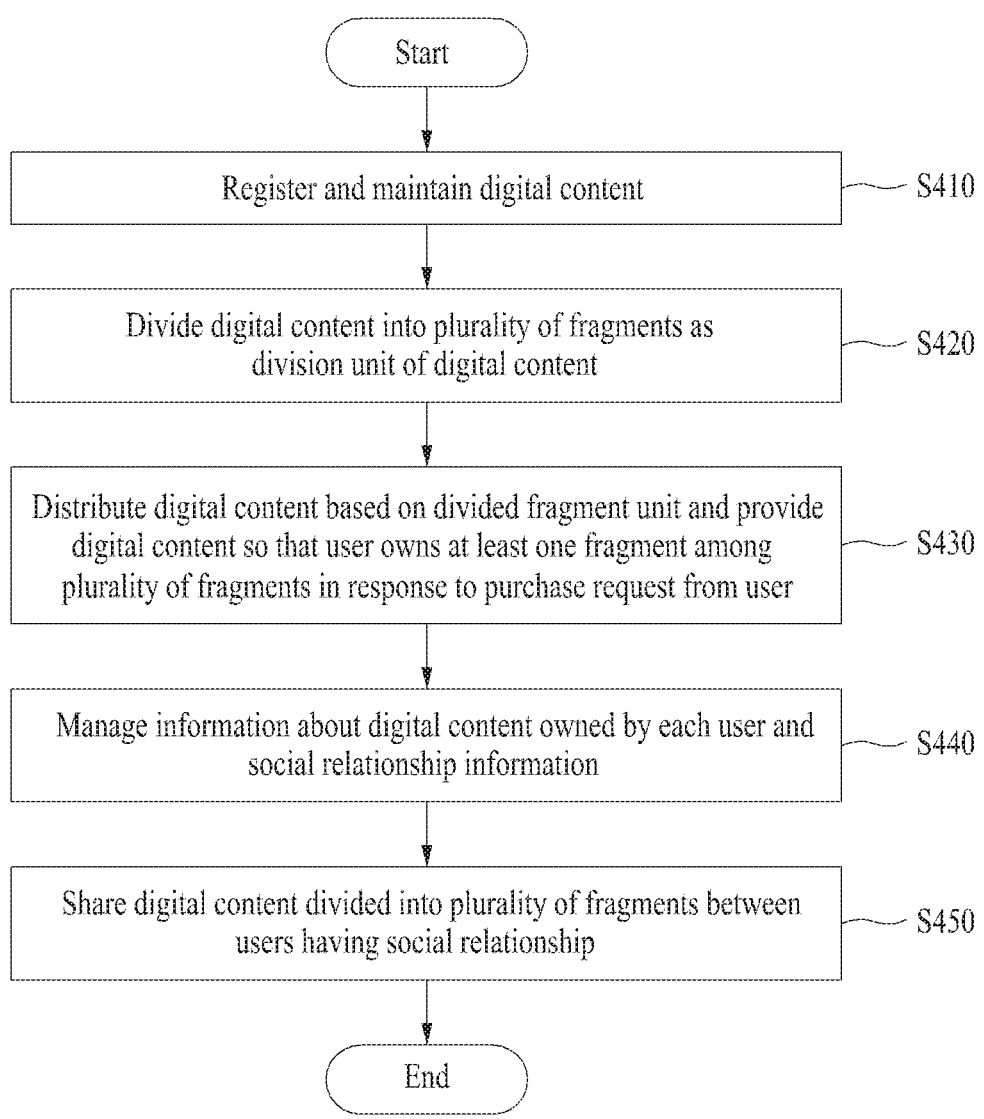
FIG. 4 is a flowchart illustrating methods performed at a server for dividing and sharing content according to example embodiments.

FIG. 3 is a block diagram illustrating constituent elements includable in a processor of a server according to example embodiments, and FIG. 4 is a flowchart illustrating methods performed at a server for dividing and sharing content according to example embodiments.

Referring to FIG. 3, the processor 222 of the server 150 may include a content manager 310, a content divider 320, a content distributor 330, an information manager 340, and a content sharer 350. The processor 222 and the constituent elements of the processor 222 may control the server 150 to perform operations S410 through S450 included in the methods of FIG. 4. Here, the processor 222 and the constituent elements of the processor 222 may be configured to execute instructions according to a code of at least one program and a code of an OS included in the memory 221. Also, the constituent elements of the processor 222 may be representations of different functions performed at the processor 222 in response to a control instruction provided from the OS or the application. In example embodiments, the content manager 310 may be used as a functional representation of the processor 222 that controls the server 150 to register and maintain digital content in response to the control instruction.

In operation S410, the content manager 310 may register and maintain digital content. A seller may register digital content the seller desires to sell to a platform associated with the server 150. In response thereto, the content manager 310 may store and manage the digital content registered by the seller in a database (not shown). Here, the database may serve to store and maintain the digital content under control of the content manager 310. Also, the database may be included as a constituent element constructed in the server 150. Alternatively, the entire database or a portion of the database may be present as an external database constructed on a separate system. Here, the term "digital content" refers to any type of information, materials, etc., represented in an electronic format to be distributed over the network 170. In example embodiments, the digital contents may include software (e.g., a mobile application, etc.), sound (e.g., music, sound effect, etc.), a moving picture (e.g., movie, a drama, an animation, a lecture, etc.), an image (e.g., comics, an illustration, a sticker, emoticon, etc.), a text (e.g., e-book, an article, etc.), and other contents (e.g., a game, an in-game item, etc.)

In operation S420, the content divider 320 may divide the digital content into a plurality of fragments as a division unit of the digital content. The division unit refers to a unit for dividing the digital content or a license of the digital content into a plurality of pieces. A variety of methods may be used as methods of dividing the digital content. A form of the division unit may be determined based on a type of digital content and the like. The content divider 320 may divide actual data (e.g., a file) of the digital content into N fragments. When the digital content includes data corresponding to the N fragments, the digital content may be available. The content divider 320 may divide a license of the digital content into N licenses. Here, when all of the N licenses are present, the N licenses may become a single license to use the digital content. The content divider 320 may divide the digital content into N layers. In example embodiments, when the digital content is a voice, an image, or a video, the content divider 320 may divide data into N layers. The content divider 320 may divide the digital content based on a time slot unit. In example embodiments, when the digital content is time-series data, such as a voice and a moving picture, the content divider 320 may divide the corresponding data into N time slots. The content divider 320 may divide the digital content based on a spatial-range unit. In example embodiments, when the digital content is spatial-array data, the digital content 320 may divide the corresponding data into N spatial ranges. The content divider 320 may divide the digital content into N libraries. In example embodiments, when the digital content is software, the content divider 320 may divide the digital content based on a single library unit. When all of the required libraries are present, a function of corresponding software may be executed. During the aforementioned digital content dividing process, a number of division units may be determined in advance. Alternatively, a number of division units may be determined based on digital content to be divided. In example embodiments, the content divider 320 may receive information about a number of users to share the digital content and may divide the corresponding digital content into a number of division units corresponding to the number of users to share the digital content.

In operation S430, the content distributor 330 may distribute the digital content based on a divided fragment unit. In example embodiments, in response to a purchase request for the digital content from the user, the content distributor 330 may sell the corresponding content based on a fragment unit that is divided based on a division unit. Here, the term "purchase" may inclusively indicate a paid or free transfer, a right transfer, and the like. The content distributor 330 may provide at least one of a plurality of fragments in a format capable of being owned by the user in response to a purchase request from the user. The content distributor 330 may transmit a portion of actual data of the digital content to the electronic device 110 based on a division unit applied to the digital content or may grant the user with a portion of a license of the digital content.

In operation 440, the information manager 340 may register and maintain all of the information required to provide a service associated with the digital content. Here, the information manager 340 may manage information about digital content owned by each user using the service. Here, the information about the digital content owned by each user may include a list of fragments divided from digital content purchased by each user. The information manager 340 may manage information about the digital content and information about a social relationship on an SNS for each user. The social relationship may be defined using a variety of methods. In example embodiments, an SNS buddy list may be defined as the social relationship. In example embodiments, a list of members included in an SNS chatroom or community may be defined as the social relationship. The information manager 340 may provide information about digital content owned by another user having a social relationship with a user that desires to purchase the digital content during a digital content distribution process to the user. In example embodiments, the information manager 340 may provide a list of fragments divided from digital content owned by each of other users with respect to each of the other users having the social relationship with the user. In example embodiments, the information manager 340 may provide information about a list of other users owning at least a portion of fragments of digital content that the user desires to purchase, or a portion of fragments that another user does not own among the fragments divided from the digital content that the user desires to purchase. Accordingly, the user may purchase a portion of the fragments of the digital content that the user desires to use through direct communication with another user having the social relationship with the user or based on information about the digital content owned by the other user having social relationship with the user.

In operation S450, the content sharer 350 may share the digital content divided into the plurality of fragments between the users having the social relationship, based on information about the digital content owned by each user and social relationship information. The other user having the social relationship with the user may use a fragment of the digital content owned by the user. On the contrary, the user may use a fragment of the digital content owned by the other user having the social relationship with the user. The content sharer 350 enables content fragments to be shared between the user and the other user having the social relationship with the user, and may provide corresponding content to the user when all of the fragments constituting the digital content are secured based on content fragments owned by the user and content fragments owned by the other user. The server 150 may set a sharing condition for each fragment of the digital content owned by the user if desired for the service. The sharing condition may be automatically set by a system or may be set as a condition requested by the user that owns a corresponding content fragment. In example embodiments, a number of other users allowed to share may be limited to be M, sharing counts may be limited, or a sharing period may be limited to be a certain period, such as 1 day for each fragment of the digital content owned by the user.

Figure 5:
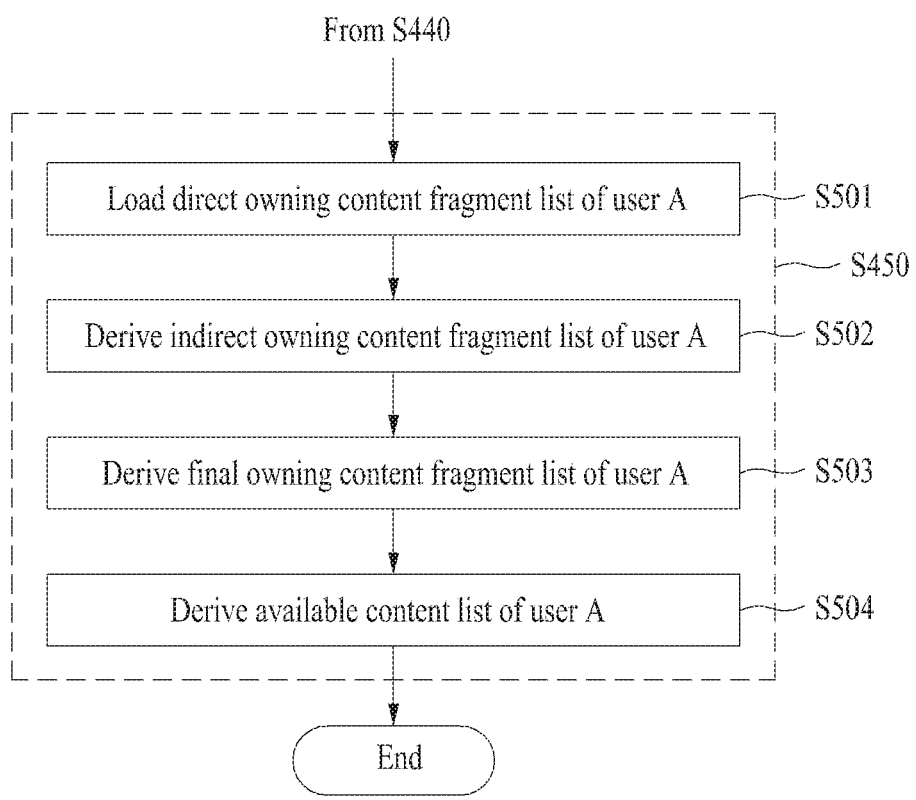
FIG. 5 is a flowchart illustrating methods of sharing digital content based on a social relationship according to example embodiments.

FIG. 5 is a flowchart illustrating methods of sharing digital content based on a social relationship according to example embodiments. Operations S501 through S504 of FIG. 5 may be performed at the content sharer 350, and may be included in operation S450 of FIG. 4 and thereby performed.

FIG. 5 illustrates a process of deriving a list of digital contents available to a user A.

In operation S501, the content sharer 350 may load a direct owning content fragment list of the user A. The direct owning content fragment list indicates a set of content fragments directly purchased and owned by the user A.

In operation S502, the content sharer 350 may derive an indirect owning content fragment list of the user A. The indirect owning content fragment list indicates a sum set of content fragments purchased and owned by other users having a social relationship with the user A.

In operation S503, the content sharer 350 may derive a final owning content fragment list of the user A based on the direct owning content fragment list and the indirect owning content fragment list of the user A. The final owning content fragment list indicates a sum set of the direct owning content fragment list and the indirect owning content fragment list.

In operation S504, the content sharer 350 may derive a content list available to the user A based on the final owning content fragment list of the user A. The content sharer 350 may provide corresponding digital content to the user A in an available state when all of the fragments that constitute the digital content are in a final owning state according to direct owning and indirect owning. That is, when all of the fragments of the digital content between the user A and the other users having the social relationship with the user A are secured, the corresponding content may be shared between the user A and the other users. In example embodiments, when at least one of the fragments that constitute the digital content is directly owned by the user A, the content sharer 350 may allow the user A to use the corresponding digital content. That is, although all of the fragments of the digital content are secured based on the social relationship of the user A, the user A may not directly own any of the fragments. In this case, the use of the digital content may be limited against the user A.

Information about digital content owned by each user and social relationship information may vary in real time and a content list available to the user may also be flexibly configured accordingly.

The server 150 may perform the process, such as operations S501 through S504, of FIG. 5 (1) at determined time intervals, (2) every time an event triggering a change of a list occurs, (3) at a point in time at which the user A requests information of the user A, or (4) at a point in time at which the user A requests sharing of digital content with at least one another user.

Here, the determined time interval may use various time intervals, such as every second, minute, day, etc. The event triggering the change of the list may indicate that a direct owning content fragment list is updated in response to a purchase action of the user, or that an indirect owning content fragment list of a user or another user having a social relationship with the user is updated due to a change in the social relationship between the users. Also, the point in time at which the user requests information of the user may indicate a case in which the user requests the server 150 for a current status of fragments owned by the user and information about an available content list using the electronic device 110. In response thereto, the server 150 may perform the process of FIG. 5 and may transmit the information requested by the user to the electronic device 110.

Figure 6:
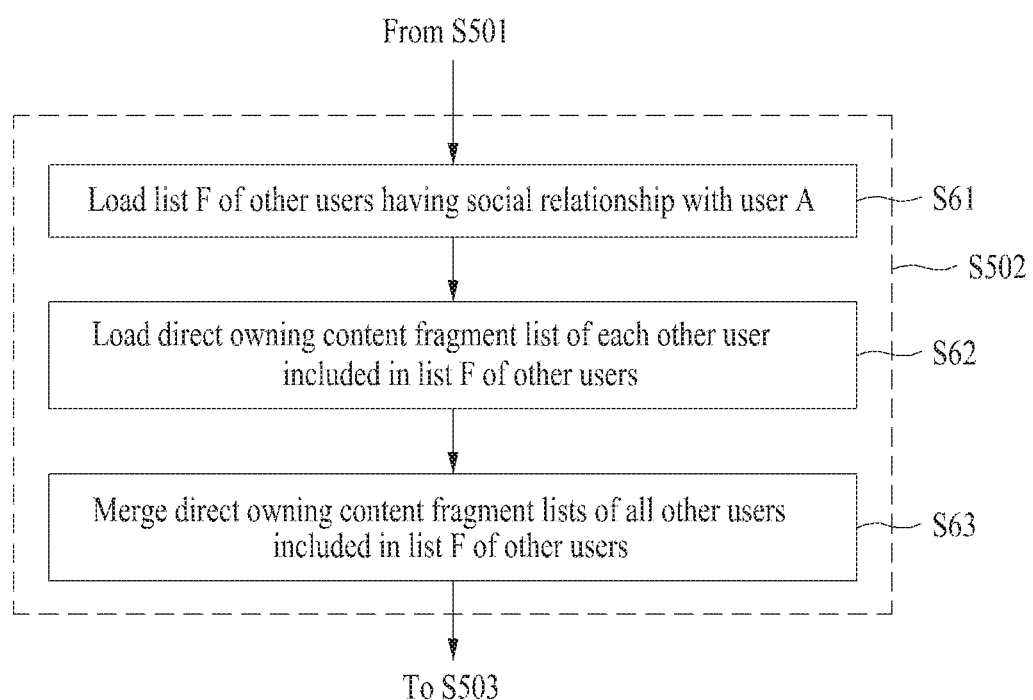
FIG. 6 is a flowchart illustrating a process of deriving a content fragment list indirectly owned by a user according to example embodiments.

FIG. 6 illustrates a process of deriving an indirect owning content fragment list of the user A according to example embodiments. Operations S61 through S63 of FIG. 6 may be performed at the content sharer 350, and may be included in operation S502 of FIG. 5 and thereby performed.

In operation S61, the content sharer 350 may load a list F of other users having a social relationship with the user A. In example embodiments, the content sharer 350 may load a buddy list of buddies having a buddy relationship with the user A on an SNS. In example embodiments, the content sharer 350 may load a list of users included in a corresponding chatroom or community with respect to the SNS chatroom or community designated by the user A.

In operation S62, the content sharer 350 may load a content fragment list directly owned by each of the other users included in the list F of other users loaded in operation S61. In example embodiments, the content sharer 350 may load a separate content fragment list for each of the other users included in the list F. The content fragment list may include fragments directly purchased or otherwise owned by the respective other user.

In operation S63, the content sharer 350 may merge direct owning content fragment lists of all of the other users included in the list F of other users loaded in operation S61. Among fragments that constitute each piece of digital content, fragments owned by more than one other user may be regarded as a single fragment and merged.

Accordingly, the content sharer 350 may derive the indirect owning content fragment list of the user A by gathering content fragments directly owned by the other users having the social relationship with the user A.

Figure 7:
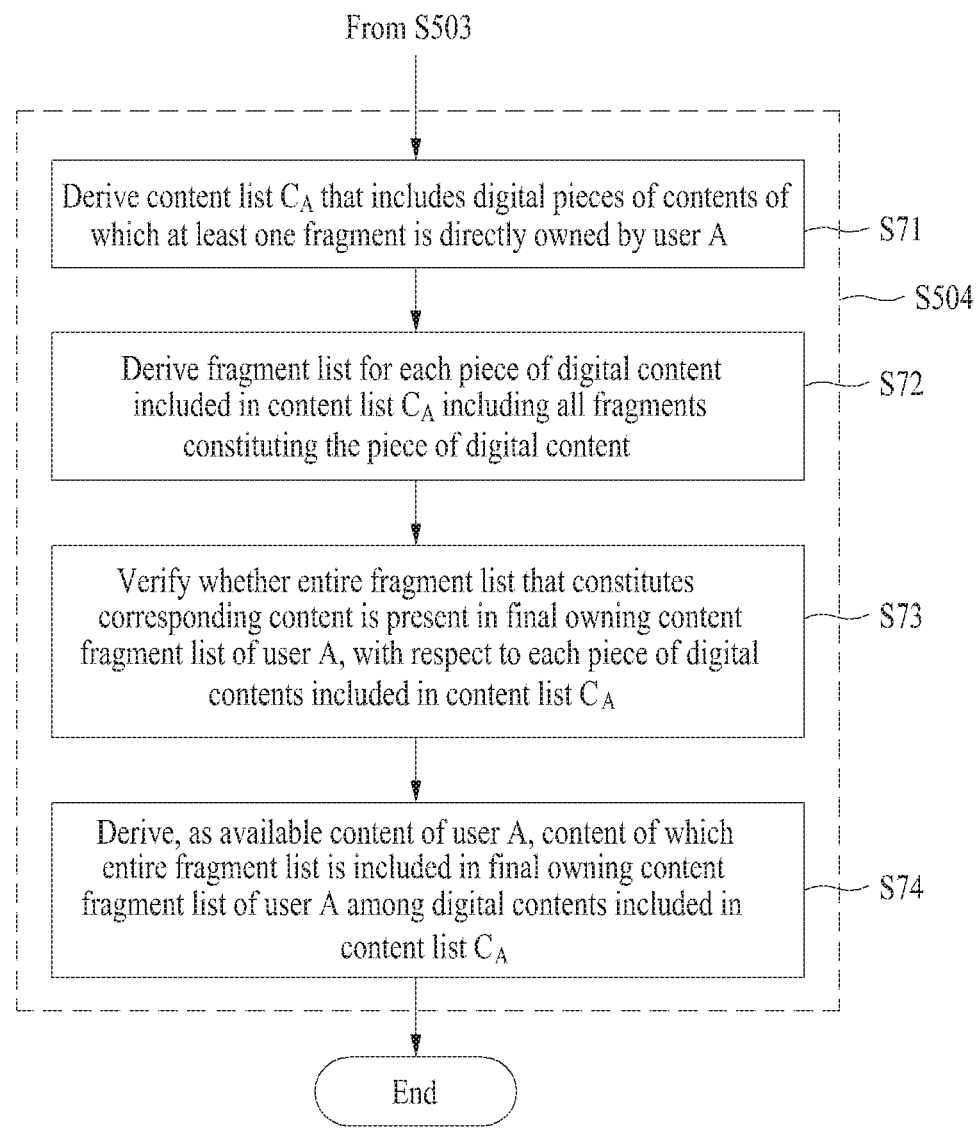
FIG. 7 is a flowchart illustrating a process of deriving an available content list of a user according to example embodiments.

FIG. 7 is a flowchart illustrating a process of deriving an available content list of the user A according to example embodiments. Operations S71 through S74 may be performed at the content sharer 350 and may be included in operation S504 and thereby performed.

In operation S71, the content sharer 350 may derive a content list CA that includes pieces of digital content of which at least one fragment is directly owned by the user A.

In operation S72, the content sharer 350 may derive a fragment list for each piece of digital content included in the content list CA, where the fragment list constitutes all of the fragments corresponding to the respective piece of digital content.

In operation S73, the content sharer 350 may verify whether an entire fragment list that constitutes the corresponding content is present in a final owning content fragment list of the user A, with respect to each piece of the digital contents included in the content list CA.

In operation S74, the content sharer 350 may derive, as available content of the user A, pieces of digital content for which the entirety of the corresponding fragment list is included in the final owning content fragment list of the user A among digital contents included in the content list CA. If at least one fragment in the fragment list of the content is absent in the final owning content fragment list of the user A, the corresponding content may be classified as content unavailable to the user A.

Accordingly, when at least one fragment in the fragment list of the digital content is present in the direct owning content fragment list of the user A and at the same time, any other remaining fragment(s) is present in the direct owning content fragment list of another user having a social relationship with the user A, the content sharer 350 may provide the corresponding content as content available to the user A.

FIG. 8 illustrates a data structure including a content fragment list owned by each user according to example embodiments.

Here, it is assumed that three users, user A, user B, and user C, are present, the user A has a social relationship with the user B and the user C, and a social relationship is not established between the user B and the user C.

Further, it is assumed that three pieces of content, content 1, content 2, and content 3, are present and each piece of content is divided based on a division unit and includes three fragments.

Each fragment of content includes information indicating direct owning, indirect owning, and final owning of each user. The direct owning indicates a content fragment directly purchased by a user, the indirect owning indicates a sum set of fragments directly owned by other users having a social relationship with the user, and the final owning indicates a sum set of the direct owning and the indirect owning.

When all of the fragments (e.g., three fragments) that constitute content are derived in a final owning state, the user may use the corresponding content. Here, the user may be required to own at least one fragment of the corresponding content to use the content.

Referring to FIG. 8, with respect to the contents 1, 2, and 3, the user A may satisfy a final owning condition since all of the fragments constituting the contents 1, 2, and 3 correspond to a sum of direct owning and indirect owning of the user A. Here, since fragments directly owned by the user A are present in the contents 1 and 2, the user A may be allowed to use the corresponding contents 1 and 2. Since a fragment directly owned by the user A is absent in the content 3, the user A may be disallowed to use the content 3.

The user B may satisfy a condition to directly own at least one fragment and a final owning condition according to direct owning and indirect owning of the user B and thus, may be allowed to use the content 2. In the case of the contents 1 and 3, a fragment that does not satisfy the final owning condition according to the direct owning and the indirect owning of the user B is present and thus, the user B may be disallowed to use the contents 1 and 3.

The user C directly owns all of the fragments that constitute the content 3 and satisfies a final owning condition without indirect owning and thus, may be allowed to use the content 3. In the case of the contents 1 and 2, a fragment that does not satisfy the final owning condition according to the direct owning and the indirect owning of the user C is present and thus, the user C may be disallowed to use the contents 1 and 2.

Accordingly, the content sharer 350 enables users having a social relationship to share content fragments owned by the users. Through this, when all of the fragments that constitute corresponding digital content are secured based on a direct owning fragment list and an indirect owning fragment list of the user, the content sharer 350 may provide the corresponding content to the user.

The aforementioned digital content providing methods may include a reduced number of operations or additional operations based on the detailed description of FIGS. 1 through 8. Also, at least two operations may be combined. Also, the order or locations of the operations may be changed.

According to example embodiments, it is possible to divide digital content into a plurality of fragments and to distribute the digital content divided into the plurality of fragments. Further, users having a social relationship may share digital content of a division unit. According to example embodiments, it is possible to effectively distribute network resources used for a service by distributing digital content based on a division unit. Through the distribution of the digital content based on the division unit, a user may use the digital content at a reduced price and a seller may improve sales of the digital content. According to example embodiments, users having a social relationship may share digital content therebetween by dividing the digital content based on a division unit. Since the users may be required to maintain the social relationship in order to share the digital content, it is possible to reduce service termination by users.

Constituent elements of processors (e.g., processor 222), such as those discussed in association with FIG. 3, described herein may be implemented using hardware components, software components, or a combination thereof. In example embodiments, a processing device may be implemented using one or more general-purpose or special purpose computers, such as a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. In example embodiments, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In example embodiments, the software and data may be stored by one or more computer readable recording mediums.

Example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Example embodiments of non-transitory computer-readable media include magnetic media such as hard disks, floppy disks, and magnetic tape; optical media such as CD ROM disks and DVD; magneto-optical media such as floptical disks; and hardware devices configured to store and perform program instructions, such as read-only memory (ROM), random access memory (RAM), flash memory, and the like. Example embodiments of program instructions include both machine code, such as produced by a compiler, and files containing higher level code that may be executed by the computer using an interpreter. The described hardware devices may function as one or more software modules in order to perform the operations of the above-described example embodiments.

The foregoing description has been provided for purposes of illustration and description. It is not intended to be exhaustive or to limit the disclosure. Individual elements or features of particular example embodiments are generally not limited to those particular example embodiments, but, where applicable, are interchangeable and can be used in other example embodiments, even if not specifically shown or described. The same may also be varied in many ways. Such variations are not to be regarded as a departure from the disclosure, and all such modifications are intended to be included within the scope of the disclosure.

What is claimed is:

1. A method performed by a server, the method comprising:
    dividing, using at least one processor, digital content into a plurality of fragments based on a determined division unit of the digital content, the digital content including a plurality of pieces of digital content;
    providing, using the at least one processor, direct ownership of at least one of the plurality of fragments to a primary user in response to a request from the primary user; and
    enabling, using the at least one processor, sharing of ownership of fragments between the primary user and at least one secondary user having a social relationship with the primary user, the enabling including,
        loading a first content fragment list including fragments directly purchased and owned by the primary user,
        deriving a second content fragment list including fragments directly purchased and owned by the secondary user,
        deriving a third content fragment list acquired by merging the first content fragment list and the second content fragment list, and
        deriving a first digital content list available to the primary user by,
            deriving a second digital content list including pieces of digital content of which at least one fragment is directly owned by the primary user,
            deriving a content piece fragment list for each piece of digital content included in the second digital content list, where the content piece fragment list includes all of the plurality of fragments corresponding to the respective piece of digital content, and
            identifying, as content available to the primary user, pieces of digital content included in the second digital content list for which the content piece fragment list corresponding to the piece of digital content is included in the third content fragment list in its entirety.

2. The method of claim 1, wherein the dividing includes dividing actual data of the digital content into the plurality of fragments.

3. The method of claim 1, wherein the dividing includes dividing a license of the digital content into a plurality of licenses, where the plurality of fragments includes the plurality of licenses.

4. The method of claim 1, wherein the dividing includes dividing the digital content into a plurality of layers, where the plurality of fragments includes the plurality of layers.

5. The method of claim 1, wherein the dividing includes dividing the digital content into a plurality of time slots in response to the digital content being time-series data, where the plurality of fragments includes the plurality of time slots.

6. The method of claim 1, wherein the dividing includes dividing the digital content into a plurality of spatial ranges in response to the digital content being spatial-array data, where the plurality of fragments includes the plurality of spatial ranges.

7. The method of claim 1, wherein the dividing includes dividing the digital content into a plurality of libraries based on a library unit, where the plurality of fragments includes the plurality of libraries.

8. The method of claim 1, wherein the dividing includes receiving information about a number of users to share the digital content and dividing the digital content into a number of fragments corresponding to the number of users.

9. The method of claim 1, wherein the deriving of the second content fragment list includes:
   loading a list of secondary users having the social relationship with the primary user;
   loading a secondary content fragment list for each secondary user included in the list of secondary users, where each secondary content fragment list includes fragments directly purchased and owned by the respective secondary user; and
   merging each secondary content fragment list into a combined secondary content fragment list.

10. The method of claim 1, wherein the deriving of the first digital content list includes:
   identifying the digital content as content available to the primary user in response to determining that all fragments of the plurality of fragments of the digital content are included in the third content fragment list.

11. The method of claim 1, wherein at least one sharing condition among a number of sharable secondary users, sharing counts, and a sharing period, is set with respect to each of fragments owned by the primary user and the secondary user.

12. A non-transitory computer-readable medium storing computer-readable instructions, which when executed by at least one processor, causes the at least one processor to implement a digital content providing method, wherein the digital content providing method comprises:
   dividing digital content into a plurality of fragments based on a determined division unit of the digital content, the digital content including a plurality of pieces of digital content;
   providing direct ownership of at least one of the plurality of fragments to a primary user in response to a request from the primary user; and
   enabling sharing of ownership of fragments between the primary user and at least one secondary user having a social relationship with the primary user, the enabling including,
      loading a first content fragment list including fragments directly purchased and owned by the primary user,
      deriving a second content fragment list including fragments directly purchased and owned by the secondary user,
      deriving a third content fragment list acquired by merging the first content fragment list and the second content fragment list, and
      deriving a first digital content list available to the primary user by,
         deriving a second digital content list including pieces of digital content of which at least one fragment is directly owned by the primary user,
         deriving a content piece fragment list for each piece of digital content included in the second digital content list, where the content piece fragment list includes all of the plurality of fragments corresponding to the respective piece of digital content, and
         identifying, as content available to the primary user, pieces of digital content included in the second digital content list for which the content piece fragment list corresponding to the piece of digital content is included in the third content fragment list in its entirety.

13. A system, the system comprising:
   a memory having computer-readable instructions stored thereon; and
   at least one processor configured to execute the computer-readable instructions to:
      divide digital content into a plurality of fragments based on a determined division unit of the digital content, the digital content including a plurality of pieces of digital content;
      provide direct ownership of at least one of the plurality of fragments to a primary user in response to a request from the primary user; and
      enable sharing of ownership of fragments between the primary user and at least one secondary user having a social relationship with the primary user, the enablement including,
         loading a first content fragment list including fragments directly purchased and owned by the primary user,
         deriving a second content fragment list including fragments directly purchased and owned by the secondary user,
         deriving a third content fragment list acquired by merging the first content fragment list and the second content fragment list, and
         deriving a first digital content list available to the primary user by,
            deriving a second digital content list including pieces of digital content of which at least one fragment is directly owned by the primary user,
            deriving a content piece fragment list for each piece of digital content included in the second digital content list, where the content piece fragment list includes all of the plurality of fragments corresponding to the respective piece of digital content, and
            identifying, as content available to the primary user, pieces of digital content included in the second digital content list for which the content piece fragment list corresponding to the piece of digital content is included in the third content fragment list in its entirety.

14. The system of claim 13, wherein the at least one processor is further configured to divide actual data of the digital content into the plurality of fragments.

15. The system of claim 13, wherein the at least one processor is further configured to divide a license of the digital content into a plurality of licenses, where the plurality of fragments includes the plurality of licenses.

16. The system of claim 13, wherein the at least one processor is further configured to:
   load a list of secondary users having the social relationship with the primary user;
   load a secondary content fragment list for each secondary user included in the list of secondary users, where each secondary content fragment list includes fragments directly purchased and owned by the respective secondary user; and
   merge each secondary content fragment list into a combined secondary content fragment list.

* * * * *